April 5, 1938. T. A. BAXTER 2,113,501
LIQUID DISPENSING OR MEASURING DEVICE
Filed April 27, 1936
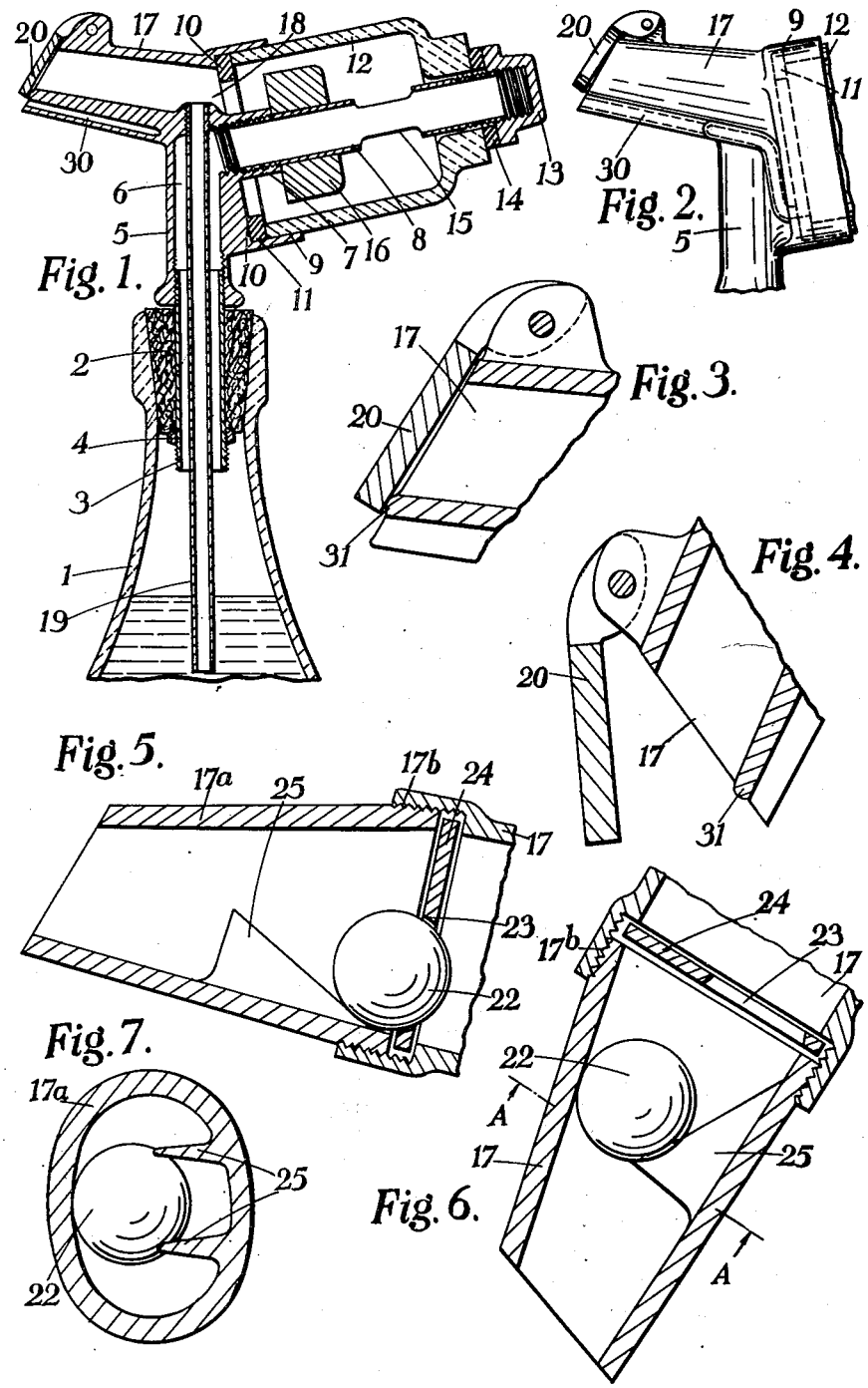
INVENTOR
Thomas Albert Baxter
BY Barker & Collings
ATTORNEYS Patented Apr. 5, 1938

2,113,501

UNITED STATES PATENT OFFICE 2,113,501

LIQUID DISPENSING OR MEASURING DEVICE

Thomas Albert Baxter, Nottingham, England

Application April 27, 1936, Serial No. 76,672
In Great Britain July 25, 1935

3 Claims. (Cl. 221—98)

This invention is for a liquid dispensing or measuring device and is concerned with a device adapted to be fitted to a bottle or equivalent container, whereby the contents may be dispensed in measured volumes. A device of this nature is particularly useful in dispensing measures of spirits such as whisky. With this object in view the invention consists of a liquid measuring and dispensing device adapted to be applied to a liquid container, such as a bottle, and comprising a measuring vessel arranged to have intermittently delivered thereto quantities of liquid from the container and from which charges of the liquid identical in volume may be delivered; and with which measuring vessel is associated or combined a readily displaceable and substitutable body adapted to be located within the measuring vessel whereby the working capacity of such vessel may be varied, as desired, thus making it entirely feasible with a single measuring vessel applicable to containers of different sizes and shapes to accurately determine the quantity of each charge of liquid that may be separately delivered therefrom, whether this quantity be greater or less, within limits, as may be desired and determined in advance by the selection of an associated replaceable device of the desired and proper size.

For the purpose of more fully describing the nature of this invention, reference will now be made to the accompanying drawing in which Figure 1 is a sectional view in which a device according to this invention is shown as fitted to the mouth of a bottle which is in the upright position.

Figure 2 is an outside elevation of a portion of said device.

Figure 3 is a sectional detail view, enlarged, showing the discharge orifice and closure when the bottle is slightly tilted.

Figure 4 is a sectional detailed view, enlarged, illustrating the attitude adopted by the closure when the bottle and the device are tilted to the discharging position.

Figures 5 and 6 are sectional detail views also on a large scale showing a modified type of closure in the closed and open positions respectively.

Figure 7 is a sectional view on the line A—A in Figure 6.

In a convenient method of carrying out the invention, the neck or mouth of a bottle 1 has fixed therein a cork or equivalent stopper 2 which is axially bored and accommodates a tube 3, said tube being preferably screw-threaded above and below the stopper 2 so as to accommodate at its lower end a fixing nut 4, and screw at its upper end into a hollow member 5 having a central bore 6 constituting an extension of the bore of the tube 3; the lower end of the member 5 being preferably flanged or enlarged to provide a bearing face for the top of the stopper 2. The member 5 advantageously constitutes a metal casting, and the central bore 6 thereof terminates in a laterally projecting internally screw-threaded boss 7 into which is screwed a tube 8; the laterally projecting tube 8, the bore 6 of the casting 5 and the tube 3 extending through the stopper all constituting one continuous passage communicating with the interior of the bottle. On the casting 5 is also formed an annular laterally projecting flange 9 encircling the aforesaid internally threaded boss 7 and within said flange 9 is a seating 10 for a rubber or like washer 11 on which bears the open end of a bell-shaped glass measuring vessel 12, said vessel encircling the laterally projecting tube 8 and being fixed in position by means of a terminal nut 13 engaging a screw-threaded outer end of said tube 8; a rubber washer 14 being interposed between said terminal nut 13 and the flat end face of the measuring vessel 12. The tube 8 is provided with two diametrically opposed openings 15 located at or near the closed end of the vessel 12, through which openings liquid can pass from the tube into said vessel 12. On the tube 8 is also advantageously fixed a circular boss or enlargement 16 which bears up against the small boss 7 into which the tube 8 is fitted.

The casting 5 is also formed with a delivery spout 17 which extends laterally in a direction opposite to that at which the tube 8 and vessel 12 extends, the vessel 12 and spout 17 being in communication one with the other by way of opening 18. A small bore air tube 19 projects down axially and centrally through the tube 3 in the stopper 2 so as to provide a liquid passage around same, said air tube being screwed or otherwise fixed at its upper end within the casting 5 and opening into the spout 17. This air tube extends below the stopper 2 into the bottle.

In the operation of pouring out liquid from the bottle, said bottle is first tipped so as to bring the delivery spout 17 in a position projecting upwardly and the measuring vessel 12 into a position projecting downwardly, and when so disposed the contents of the bottle flow by way of the tube 3, bore 6 of the casting 5, laterally extending tube 8 and openings 15 into the measuring vessel 12, and after a predetermined quantity of liquid has been received within the measuring vessel or when said vessel has become full, the bottle is turned round through 180° so as to project the spout 17 downwards, and the measured quantity of liquid within the vessel 12 is then delivered by way of said spout.

In order to permit air to flow into the measuring vessel 12 to replace the liquid discharged from it, there is an air conduit 30 which leads from the mouth of the discharge spout 17 to the face or seating 18. It is desirable that this air conduit shall open into the vessel to one side of the vertical diametral plane in which the centre line of the vessel lies when the bottle is upright. If this arrangement is adopted, when turning or rotating the bottle from an attitude in which the measuring vessel 12 is downwardly directed (so that the contents of the bottle flow into the said vessel) to an attitude in which the spout 17 is downwardly directed and the vessel 12 is upwardly directed (so that the contents of the vessel are discharged by way of the opening 18 and the spout 17) there is little fear that any quantity of liquid will be discharged down or block the conduit 30.

In order to close the spout 17 at all times except when liquid is being poured out therethrough, said spout is provided with a closure member. In the arrangement shown in Figs. 1 to 4 this closure member comprises a hinged flap 20 of metal or other suitable material, the hinge for said flap 20 being at the top of the outer end of the spout when the device is in the inoperative position.

In order to prevent the closure flap 20 from sticking to the end face of the spout 17 (it being understood that if the device is used for dispensing certain liquids, these liquids will make the end face sticky) means may be provided for preventing the flap 20 from closing completely down on to the end face. The said means conveniently comprises a lip or projection 31 located at the bottom of the discharge orifice of the spout, as shown more particularly in Figures 3 and 4. Although by such a projection the closure flap is held slightly open the opening provided (and that provided by the air vent 30) is insufficient to permit any appreciable evaporation of the contents or ingress of impurities. It will be appreciated that when the bottle is upright the closure flap 20 is automatically maintained closed by gravity, and this position is also maintained during the operation of filling the measuring vessel 12. When, however, the bottle is twisted round to deliver the measured quantity, the hinged closure automatically opens to permit free delivery.

In a modified arrangement (Figs. 5 to 7) the closure for the spout 17 comprises a metal ball valve 22 adapted normally to close an opening 23 in a valve seating 24 provided at a suitable position within said spout.

Preferably the seating 24 is a separate disc or the like fixed in position by forming the spout in two parts 17a and 17b, said parts being screwed one within the other and the seating 24 being fixed at the joint between same. The valve opening 23 has a curved or bevelled face for snugly accommodating the ball 22, and said opening is located at the lower part of the seating disc 24. In front of the ball valve 22 one or more inclined ribs or the like 25 may be provided functioning to guide the ball to the closed position in the opening 23 and to ensure that the ball valve is maintained normally closed.

In this modified arrangement, when a measured quantity of liquid is being delivered by way of the spout, said spout projects downwardly and the ball valve 22 consequently rolls along the inclined rib or ribs 25 so as to open the valve opening 23 and permit the liquid to flow freely past the ball from the spout. When, however, the bottle is returned to the upright position, the ball rolls down the inclined rib or ribs and closes the valve opening, and thereby closes the bottle and measuring vessel to the outer atmosphere.

The measuring vessel 12 may, if desired, be provided with graduations so as to enable different quantities of liquid to be measured thereby. The lateral extension 8 of the pouring tube may have fitted thereon bosses 16 of different diameters and/or thicknesses so as to increase or decrease the capacity of the vessel 12 and thereby enable different quantities of liquid to be measured by completely filling one and the same measuring vessel; it being understood that if the boss 16 is comparatively large, the capacity of the measuring vessel is reduced and vice versa. The boss 16 also serves to hide from view the rough interior of the casting 5 behind said boss.

I claim:—

1. A liquid dispensing or measuring device comprising, in combination, a stopper adapted to be fitted to the mouth of a bottle or the like, a conduit extending through the stopper, a transparent measuring vessel removably mounted on the stopper and projecting laterally therefrom, the said conduit having a lateral branch extending and opening into the measuring vessel, a delivery spout projecting from the stopper in an opposite direction to the measuring vessel, a boss or enlargement removably and interchangeably fitted within the measuring vessel and supported on the lateral branch of the conduit so that by fitting bosses of different dimensions the capacity of the measuring vessel can be varied, said boss being fitted so that the contents can flow freely around and past same from the measuring vessel to the delivery spout, a closure for the delivery spout functioning normally to close said spout and automatically to open when the contents are being poured out and a restricted air vent extending from the delivery spout to the measuring vessel.

2. In the device claimed in claim 1, the inclusion of a closure for the delivery spout comprising a hinged lid at the outer end of said spout.

3. In the device claimed in claim 1, a closure for the delivery spout comprising a ball valve and seating therefor in said spout.

THOMAS ALBERT BAXTER.